United States Patent [19]
Chinosi et al.

[11] Patent Number: 5,905,387
[45] Date of Patent: May 18, 1999

[54] ANALOG VOLTAGE-SIGNAL SELECTOR DEVICE

[75] Inventors: Mauro Chinosi, Cologno Monzese; Roberto Canegallo, Tortona, both of Italy; Alan Kramer, Berkeley, Calif.; Roberto Guerrieri, Bologna, Italy

[73] Assignee: STMicroelectronics, S.r.l., Agrate Brianza, Italy

[21] Appl. No.: 08/742,978

[22] Filed: Nov. 1, 1996

[30] Foreign Application Priority Data

Nov. 3, 1995 [EP] European Pat. Off. .............. 95830466

[51] Int. Cl.⁶ .............................. H03K 5/24; H03L 5/00; G01R 19/00
[52] U.S. Cl. ................................ 327/62; 327/63; 327/64; 327/50; 327/58; 326/35
[58] Field of Search .................................. 327/50, 62, 63, 327/71, 58, 20, 90, 91, 94; 326/35, 36

[56] References Cited

U.S. PATENT DOCUMENTS

| | | | |
|---|---|---|---|
| 5,408,194 | 4/1995 | Steinbach et al. | 327/62 |
| 5,539,340 | 7/1996 | Van Leeuwen et al. | 327/52 |
| 5,546,028 | 8/1996 | Yamaguchi | 327/90 |

FOREIGN PATENT DOCUMENTS

| | | |
|---|---|---|
| 0 653 793 | 7/1993 | European Pat. Off. . |
| 362266910 | 11/1987 | Japan ...................................... 327/206 |
| 404014312 | 1/1992 | Japan ........................................ 327/62 |

OTHER PUBLICATIONS

Yamashita, Takeo et al., "Neuron MOS Winner–Take–All Circuit and Its Application to Associative Memory," in *IEEE International Solid–State Circuits Conference*, New York, Feb. 1993, pp. 236–237, and 294.

*Primary Examiner*—Dinh Le
*Attorney, Agent, or Firm*—David V. Carlson; Seed & Berry LLP

[57] ABSTRACT

The present invention relates to an analog voltage-signal selector device of the type comprising at least one plurality of comparator circuits operating in parallel and each having at least a first and second input terminals and designed to receive respectively an analog voltage-comparison signal and analog voltage signals of predetermined value and at least one output terminal for digital voltage signals. This selector device also comprises at least one logic circuit having a plurality of input terminals each connected to a corresponding output terminal of the comparator circuits and at least one output terminal. Finally the selector incorporates at least one plurality of latches each having at least one input terminal connected to the output terminal of a corresponding comparator circuit and at least one drive terminal coupled to the output terminal of the logic circuit with each of the memory circuits having at least one output terminal corresponding to an output of the selector.

20 Claims, 5 Drawing Sheets

ANALOG VOLTAGE-SIGNAL SELECTOR DEVICE

TECHNICAL FIELD

The present invention relates generally to analog voltage-signal selector devices, and more specifically to a device for selecting within a group of analog voltage signals of predetermined value the one with the highest value.

The field of application of the present invention specifically concerns pattern classifiers and the following description is given with reference to a device for selecting within a group of analog voltage-signals of predetermined value the one with the highest value.

BACKGROUND OF THE INVENTION

As known, the majority of these devices, which are known in the literature as "Winner Take All" (WTA), are provided by means of architectures which exhibit a voltage-follower configuration and make use of inhibitor mechanisms operating among the calculation elements included in them.

A first known technical solution, shown in FIG. 1 and described in the article "Winner Take All Networks of O(N) Complexity," J. Lazzaro et al., Neural Inform Proc. Syst. 1:703–711, Denver, Colo., 1989, calls for the use of a selector device 1 comprising a plurality of circuit branches 2 operating in parallel and each including a first voltage follower transistor T1i and a second local positive feedback transistor T2i, where i=1,. . . j, . . . n.

The device I also comprises a total feedback line LN common to all the circuit branches 2.

Operation of the selector device 1 is as follows.

Each circuit branch 2 receives the input of a one-way current Ii and supplies output of a voltage Vi which represents the result of the selection process.

When the current Ii=max (Il,. . . In), the voltage Vi coincides with a logarithmic function of Ii, and if the current Ij<<Ii, the voltage Vj~0.

Although advantageous in some ways, this first solution exhibits diverse shortcomings.

Indeed, the device 1 does not provide any offset compensation and has a calculation time which depends on the number of elements making it up.

A second known technical solution is described in the article "A Scalable High-Speed Current-Mode Winner Take All Network for VLSI Neural Applications," Sean Smedley et al., *IEEE Transactions on Circuits and Systems-I: Fundamental Theory and Applications* 42(5), 1995 which proposes a tree-structured circuit comprising a plurality of cells provided by using bipolar transistors integrated with a BICMOS technology.

Each cell receives at input two current signals I1 and I2 which are compared with each other to select the highest one.

The latter represents the input for a cell included in a subsequent layer of the tree structure and so on until there is obtained at output the higher input current signal.

SUMMARY OF THE INVENTION

In accordance with one aspect of the present invention, an analog voltage-signal selector device includes a plurality of comparator circuits that operate in parallel and that each have at least a first and a second input terminal that are designed to receive respectively an analog voltage-comparison signal and analog voltage signals of predetermined value, and that each include at least one output terminal that provides a digital voltage signal. The selector device also includes at least one logic circuit that has a plurality of input terminals that are each coupled to the output terminal of a corresponding one of the comparator circuits, and that each have at least one output terminal. A plurality of latches each have at least one input terminal that is coupled to the output terminal of a corresponding one of the comparator circuits and that each have at least one drive terminal coupled to the output terminal of the logic circuit, and each having at least one output terminal that corresponds to an output of the selector device.

An advantage of the present invention is that it provides an analog voltage-signal selector device having low calculation time in addition to exhibiting high accuracy and flexibility.

BRIEF DESCRIPTION OF THE DRAWINGS

The characteristics and advantages of the method in accordance with the present invention are set forth in the description of an embodiment thereof given below by way of nonlimiting example with reference to the annexed drawings.

DETAILED DESCRIPTION OF THE INVENTION

With reference to FIGS. 2–8, reference number 1 indicates as a whole and diagrammatically an analog voltage-signal selector device provided in accordance with the present invention.

Figure 2:
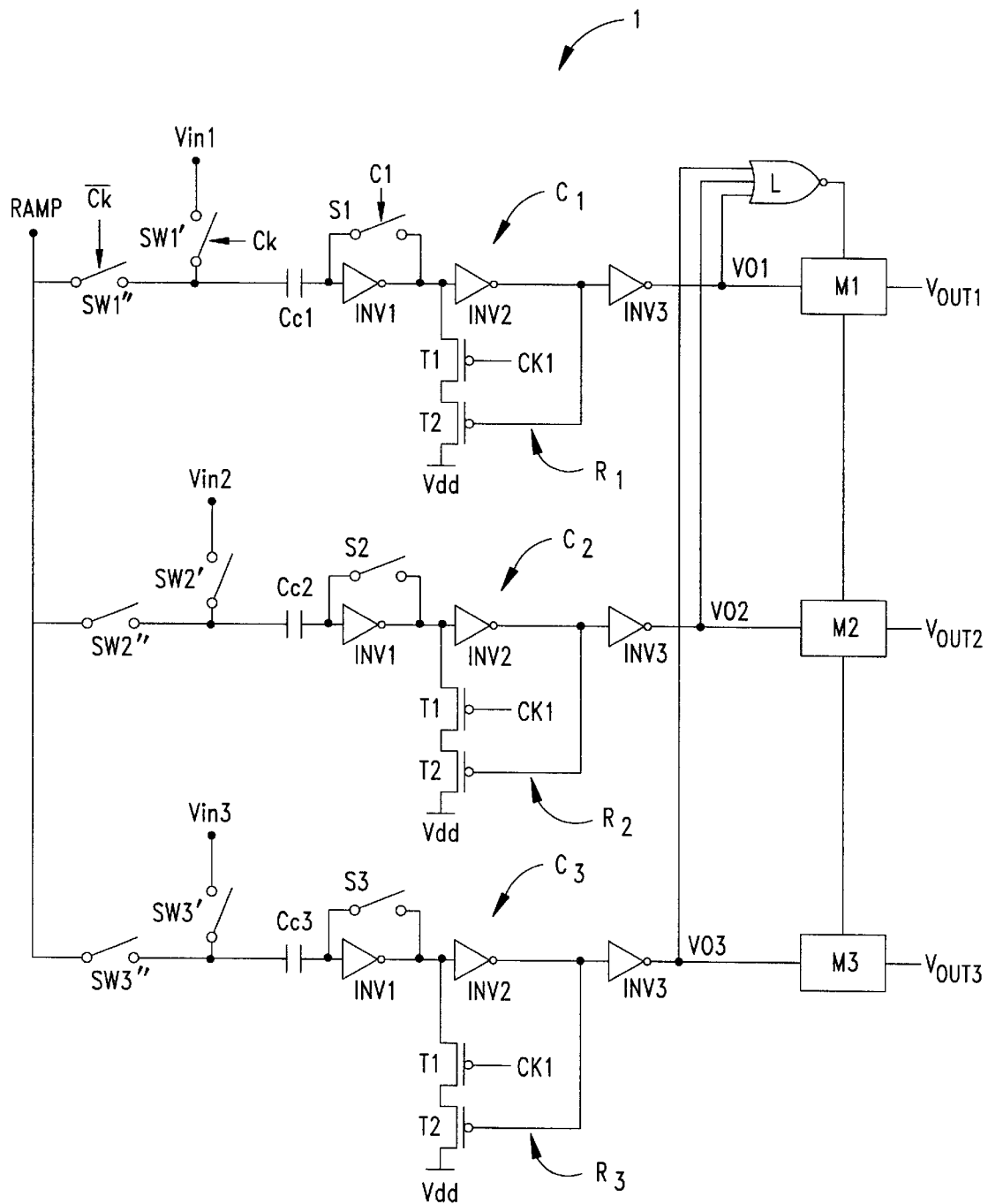
FIG. 2 shows a block diagram of a selector device provided in accordance with the present invention.

With reference to FIG. 2, the selector device 1 comprises a plurality of comparator circuits Ci with, e.g., i=1, 2, 3, and operating in parallel.

Each comparator circuit Ci comprises first and second input terminals designed to respectively receive an analog voltage comparison signal RAMP and analog voltage signals Vi of predetermined value, and an output terminal for digital voltage signals Voi.

The analog voltage comparison signal RAMP and the analog voltage signals Vi are obtained through first conventional signal generator means that are outside the device 1 and thus not shown in FIG. 2 for clarity.

Figure 1:
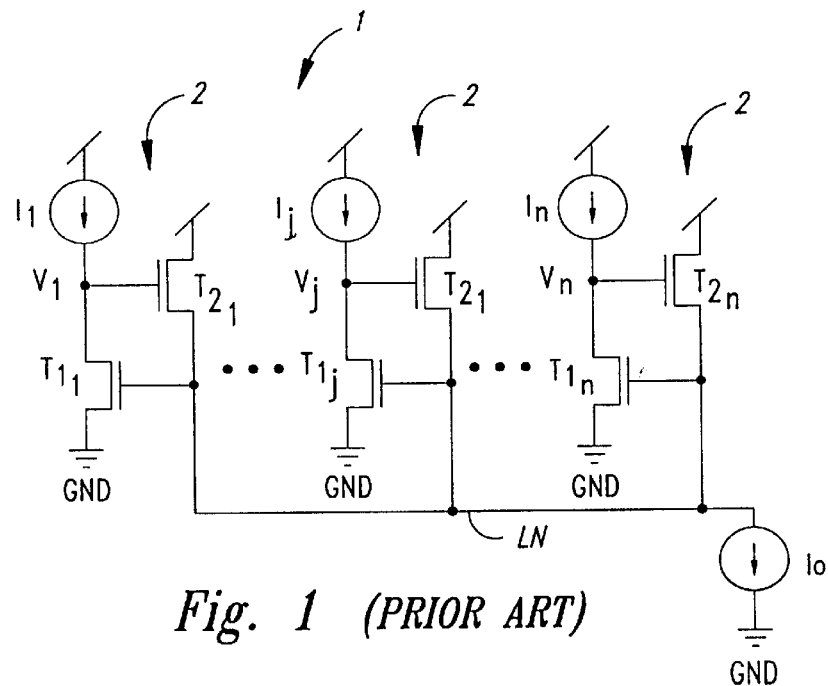
FIG. 1 shows a circuit diagram of a selector device provided in accordance with the prior art.
Figure 3:
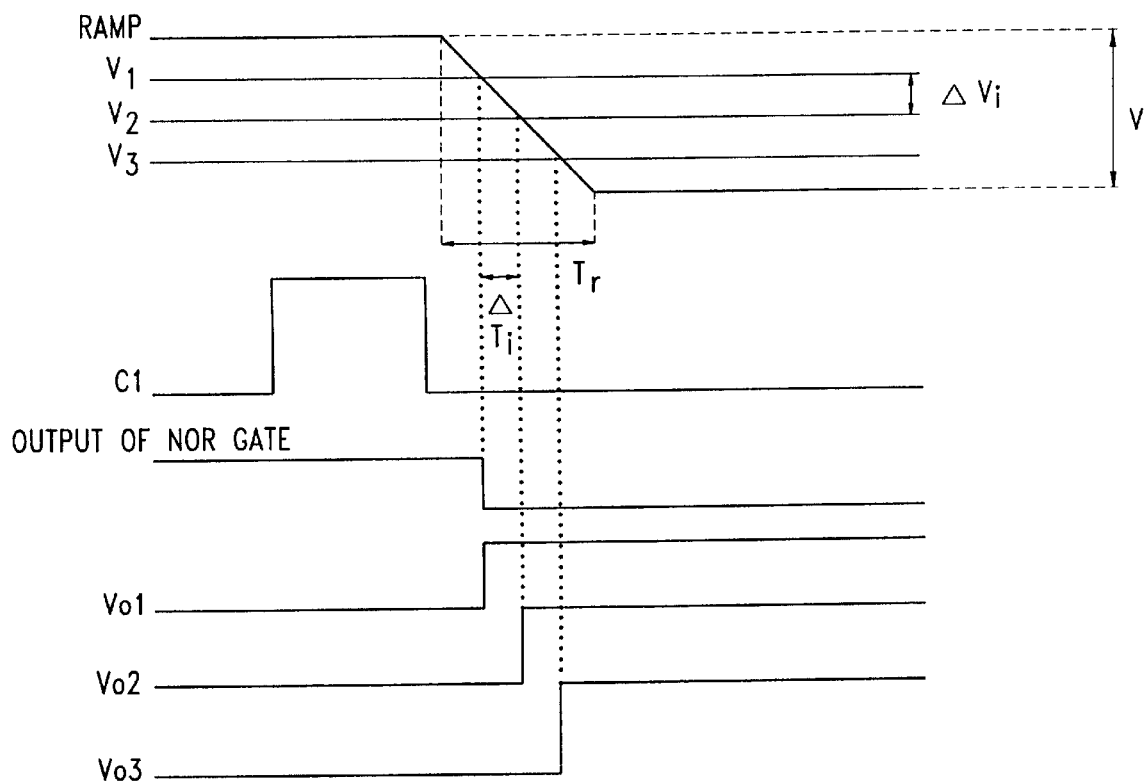
FIG. 3 shows charts, with the same time base, of electrical signals present in the device of FIG. 2.

In addition, the analog voltage comparison signal RAMP is the decreasing monotone type as shown in FIG. 3.

Each comparator circuit Ci also incorporates between its input terminals and its output terminal first, second, and third inverters INV1, INV2, and INV3, which are mutually cascaded, i.e., serially coupled, with one another.

The first inverter INV1 comprises an input terminal and an output terminal that is fedback to the input terminal through a first switch circuit element Si.

This first switch circuit element Si is driven by means of a third digital signal C1, shown in FIG. 3, and obtained through second conventional signal generator circuit means that are external to the device 1 and thus not shown in FIG. 2 for clarity.

The first and second input terminals of each comparator circuit Ci are alternately coupled to the input of the first inverter INV1 through a second and a third switch circuit elements SWi' and SWi", respectively, which are both coupled to a capacitive element Cci.

The second SWi' and third SWi' switch circuit elements are driven respectively by a first digital clock Ck and a second complementary digital clock $\overline{Ck}$ that are generated by third conventional signal generator circuit means that are external to the device 1 and thus not shown in FIG. 2 for clarity. In one aspect of the invention, Ck is the same as C1 of FIG. 3, and $\overline{Ck}$ is the inverse of C1.

The device 1 also incorporates a logic circuit L—a NOR gate L in the illustrated embodiment—having a plurality of input terminals that are each coupled to a corresponding output terminal of the comparator circuits Ci, and having an output terminal.

The device 1 comprises lastly a plurality of latches Mi each having an input terminal connected to the output terminal of a corresponding comparator circuit Ci and a drive, i.e., enable, terminal coupled to the output terminal of the logic circuit L.

These latches Mi also include output terminals (i.e., $V_{OUT1}$, $V_{OUT2}$, $V_{OUT3}$, respectively) that provide the outputs of the device 1.

Figure 4:
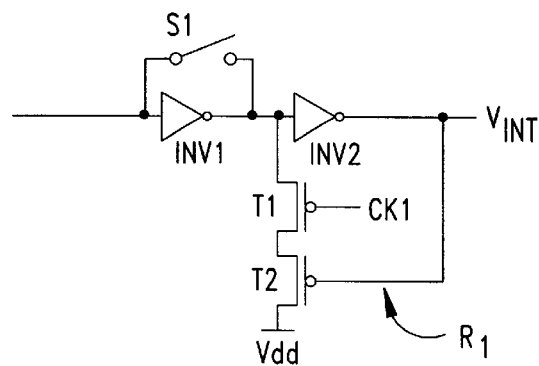
FIG. 4 shows a portion of the device of FIG. 2.
Figure 5:
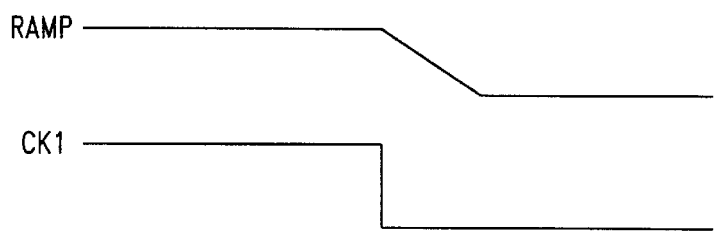
FIG. 5 shows a time chart of electrical signals present in the circuit portion shown in FIG. 4.

Referring to FIGS. 4 and 5, the comparator circuit Ci also comprises a feedback network Ri that is inserted between the output terminal $V_{INT}$ and the input terminal of the second inverter INV2, and is designed to reduce the response time of the inverter INV1.

This feedback network Ri comprises a first p-channel MOS enhancement transistor T1 having a first terminal connected to the input terminal of the second inverter INV2, having a control terminal coupled to drive circuit means designed to generate a digital signal Ck1—which is shown in FIG. 5—and having a second terminal.

The feedback network Ri also comprises a second p-channel MOS transistor T2 having a first terminal connected to the second terminal of the first transistor T1, a second terminal connected to the supply voltage reference Vdd, and a control terminal connected to the output terminal of the second inverter INV2.

Figure 6:
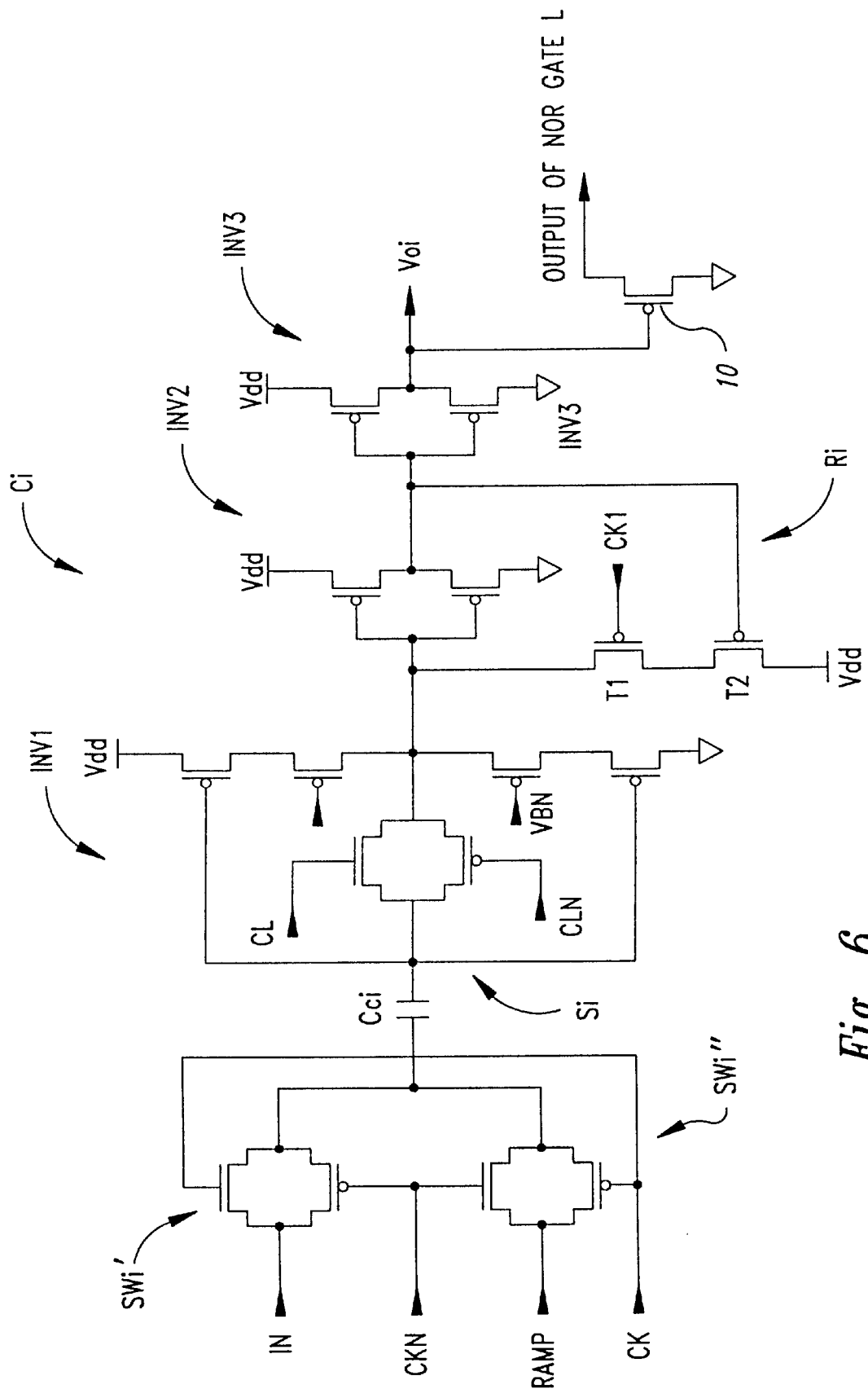
FIG. 6 shows a possible circuit embodiment of a portion of the block diagram of FIG. 2.

FIG. 6 shows one possible circuit embodiment of the comparator circuit Ci of the selector device 1.

With reference to FIG. 6, the first Si, second SWi' and third SWi" switch circuit elements are the complementary CMOS type.

The first inverter INV1 is implemented by means of the cascade between a first and a second p-channel MOS transistors and a third and a fourth n-channel MOS transistors while the second inverter INV2 includes the cascade between fifth and sixth transistors that are respectively p-channel and an n-channel MOS transistors having control terminals connected together. The third inverter INV3 includes a p-channel transistor that is cascaded with an n-channel transistor.

The logic circuit L is provided as a wired NOR gate with n inputs where n is the number of comparator circuits Ci included in the device 1. For example, in this case n=3. The output of the inverter INV3, i.e., the output Voi, is coupled to the gate of a transistor 10. The drain of the transistor 10 is wired to the drains of the transistors 10 of the remaining comparators Ci. Thus, the drains of the transistors 10 of all the comparators Ci are wired together to form the output of the NOR gate L. A pull-up impedance (not shown) couples the wired NOR output of the gate L to Vdd. Alternatively, the inverters INV3 may be omitted, and the NOR gate replaced with an AND gate.

The latches Mi are conventional, and for clarity, are omitted from FIG. 6.

Still referring to FIG. 6, there is now described operation of the device 1 in accordance with the present invention with specific reference to an initial state in which the first Si and second SWi' switch circuit elements are closed, while the third switch circuit element SWi" is open.

In this first phase, termed "memorization," the second input terminals of the comparator circuits Ci simultaneously receive the analog voltage signals Vi while the input of the first inverter INV1 is short-circuited with its output.

The capacitive element Cci is charged to a voltage $Vc_{ci}$ corresponding to the difference between the input voltage signal Vi and a threshold voltage Vthi for each comparator Ci, i.e.:

$$Vc_{ci}=Vi-Vthi=Vi-(Vthn-Voffi)$$

where Vthn is the nominal threshold voltage of INV1, while Voffi represents the offset voltage for the threshold voltage Vthi and can differ from one comparator to another.

During the memorization phase, in each comparator Ci flows a supply current, which charges the capacitive element Cci and which drives toward equilibrium the voltages present at the input and output of the first inverter INV1.

After this first phase, the first Si and the second SWi' switch circuit elements open while the third switch circuit elements SWi" close.

During this second phase, termed "comparison," the first input terminal of each comparator Ci receives the analog voltage comparison signal RAMP.

The initial voltage value of RAMP is greater than the maximum value reached by any of the input voltage signals Vi.

In the comparison phase, the input of the first inverter INV1 presents a high impedance so that the capacitive element Cci behaves like a DC level shifter and takes this input to a level such that the first inverter INV1 generates a low logic level at its output.

In this manner all the outlet terminals Voi of the comparators Ci are at a low logic level, the output of the NOR gate L is at a high logic level, and all the latches Mi are enabled or disabled, depending on whether the latches are active low or active high as discussed below.

When the voltage comparison signal RAMP begins to decrease linearly in time with constant slope, there is created on the input of the first inverter INV1 a voltage Vfi which follows the linear decrease of RAMP, but which is offset from RAMP by the voltage stored on the capacitor Cci.

When the voltage Vfi reaches the value:

$$Vfi=Vthn-Voffi \qquad (1)$$

the output of the first inverter INV1 begins to transition from a logic low to a logic high, as does Voi.

Formula (1) can also be rewritten as follows.

$$Vfi=Vramp-Vc_{ci}=Vramp-(Vi-(Vthn-Voffi))=Vthn-Voffi.$$

By simplifying the common terms, the voltages Voi at the output terminals of the comparators Ci begin to move to a high logic level when:

$$Vramp=Vi.$$

Consequently, since initially the voltage comparison signal RAMP has a value higher than the maximum value reached by any of the input voltage signals Vi, and in addition is monotonically decreasing, the voltage Voi at the output terminal of the comparator Ci that receives at its input the input voltage signal Vi of highest value begins transitioning to logic high first, while each of the voltages Voi at the output terminals of the other comparators Ci begin their transitions at a subsequent time that is proportional to the value of the corresponding input voltage signal Vi previously memorized.

For example purposes, the digital voltage signals Voi are shown in FIG. 3 where Vo1>Vo2>Vo3.

The logic gate L detects which output Voi of the comparators Ci first moves to a high logic level, and in response to this detection, generates a logic low at its output terminal. In one embodiment of the invention, the latches Mi are active low, such that the logic low at the output of the logic gate L enables them. In this embodiment, in response to the logic gate L detecting the first logic-high output voltage Voi of the comparator Ci that corresponds to the highest voltage Vi, the logic gate L enables all of the latches Mi such that the latch Mi that corresponds to the highest voltage Vi stores and outputs a logic high.

The remaining latches Mi then store high logic levels successively in such a manner as to output from the device 1 a digital vector comprising n components, where n corresponds to the number of input voltage signals Vi.

The components of the output vector at each instant represent the outputs OUTi activated, i.e., at a high logic level, up to that moment.

If the output vector is read when it contains only a single logic "1," the selector device 1 implements the so-called WTA function. That is, the selector device 1 is being used to determine which of the signals Vi has the highest value.

In another embodiment of the invention, all of the latches Mi are active high. Thus, before the logic gate L detects the highest voltage Vi, i.e., before RAMP descends to the highest voltage Vi, all of the latches Mi are enabled. When the output voltage Voi corresponding to the highest voltage Vi transitions to a logic 1, this logic high is stored in the corresponding latch Mi. After a time that is equal to the delay of the NOR gate L, the output of the NOR gate L transitions to a logic low and thus disables all of the latches Mi. Thus, only the latch Mi that corresponds to the highest voltage Vi stores a logic high, and the remaining latches store a logic low. Thus, one can examine the outputs of the latches Mi to determine which of the signals Vi has the highest value, and can perform this examination at virtually any time after the highest value Vi is detected without having to worry that the state of the remaining latches will change as the ramp further decreases.

In addition, by inverting the slope of the voltage comparison signal RAMP and changing the MOS feedback transistors T1 and T2 from p-channel to n-channel, the same architecture provided in accordance with the present invention permits sorting the values of the input voltage signals Vi in increasing order and detecting among them the one with the least value, (Loser Take All [LTA]).

Specifically, the main condition for implementation of a WTA function with high precision is linked to the separation in time of the individual components of the output vector.

To separate two consecutive components of the output vector the delay between them must be greater than the delay introduced by the logic gate L.

Defining the delay introduced by the logic gate L as "Tdgn," Tdgn is the minimum time Tm required to separate two consecutive components of the output vector, that is:

$$Tm=Tdgn.$$

With reference to FIG. 3, it is found that the separability condition for a differential input voltage signal $\Delta Vi$ corresponding to a distance in time $\Delta Ti$ is given by:

$$\Delta Ti = \Delta Vi/S = \Delta Vi/(V/Tr) = \Delta Vi*(Tr/V) > Tm \qquad (2)$$

where V is the amplitude of the voltage reference signal RAMP, Tr is the time employed by this signal to cover the amplitude V and S is its slope.

Once the value of the parameter V is set in accordance with the interval of values in which are included the input voltage signals Vi, condition (2) is satisfied when:

$$Tr>Tm(V/\Delta Vi).$$

By decreasing the value of Tr below this value, more than one output voltage Voi can be activated, i.e., logic high, before the logic gate L enables or disables the latches Mi. Thus, several winners can be drawn at the same time.

The parameter Tr can also be used for selecting the highest or the lowest allowed intervals $\Delta Vi$ between the input voltage signals Vi.

From the above discussion it follows that by decreasing or increasing the parameter Tr, i.e., by modifying the slope of the voltage comparison signal RAMP, the precision of the device 1 increases or decreases.

It also follows that the feedback network R contributes to reducing the uncertainties present in the device 1 and to increasing its speed.

The network R is enabled after the comparison phase is terminated, but begins to act only when the first inverter INV1 begins changing its output state from a logic low to a logic high.

Once the output of this first inverter INV1 is at a high enough level to permit the second inverter INV2 to modify its output state to a logic low, the feedback network Ri causes the output level of the first inverter INV1 to rise faster.

The feedback network Ri can be disabled after the voltage signals Voi have been memorized by the latches Mi.

Figure 7:
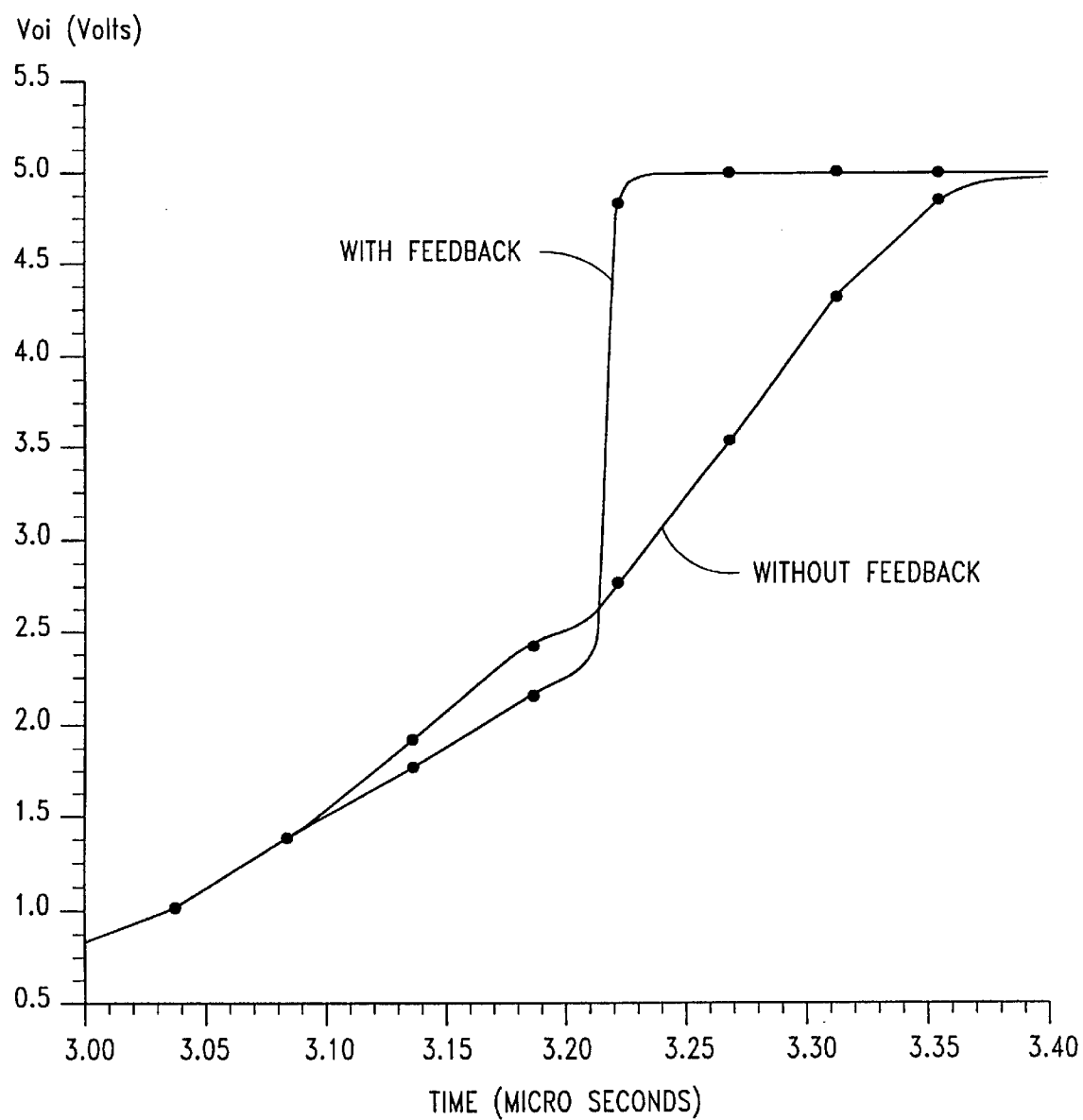
FIG. 7 shows a time chart of additional electrical signals present in the circuit portion shown in FIG. 4.

FIG. 7 shows the behavior of the voltage signal output from the first inverter INV1 with and without the feedback network R.

Figure 8:
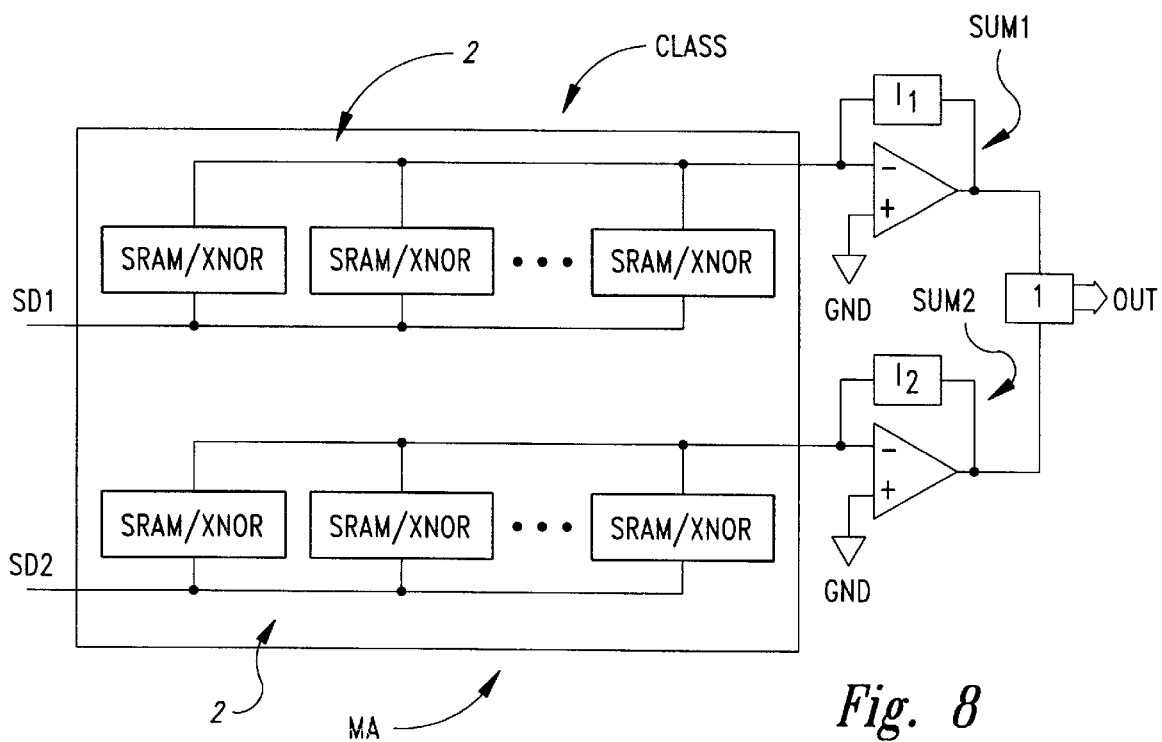
FIG. 8 shows a possible circuit application of the selector device in accordance with the present invention.

FIG. 8 shows a conventional electronic classification system CLASS including a selector device having outputs OUT provided in accordance with the present invention.

The electronic classification system CLASS comprises a plurality of input terminals designed to receive strings of digital signals SDi with, e.g., i=1, 2, and a plurality of output terminals.

This system also includes an associative memory MA comprising groups 2 of memory blocks SRAM/XNOR connected together through respective input terminals leading to an input terminal of the system and each having an output connected to a same output of the membership group 2.

The memory MA makes a comparison between strings of digital reference signals stored therein and the digital input signal SDi strings. For example, each of the memory blocks in the first group 2 compares a component of the input vector SD1 with a stored value and then outputs a current on the node 2 that is representative of the comparison. In one aspect of the invention, if the compared component of the vector SD1 and the value stored in the associated memory block SRAM/XNOR are equal, the memory block sinks a current from node 2, and if the vector component and stored value are not equal, the memory block neither sinks nor sources a current to the node 2.

The classification system CLASS also incorporates a plurality of adding circuits SUMi each having an output terminal and at least one first input terminal connected to an output of a corresponding group 2 of the associative memory MA and a second input terminal connected to a fixed voltage reference GND. Thus, each adding circuit SUMi converts the sum of the currents generated by the memory blocks in a corresponding group 2 into a voltage at the output of the circuit SUMi. In one aspect of the invention, the circuits SUMi each include an operational amplifier that has its noninverting input terminal coupled to ground and its inverting input terminal coupled to the common output of the associated group 2 of memory blocks. A feedback impedance Ii is coupled between the inverting input terminal and the output of the operational amplifier.

Finally, the system CLASS comprises a selector device 1 of FIG. 2 that has its input terminals respectively coupled to the output terminals of the circuits SUMi. The outputs OUT of the selector device I provide the output terminals of the CLASS system.

In the application described here, the device 1 selects the memorized digital signal string corresponding to the input digital signal string on the basis of a relationship implemented in the memory MA. Specifically, in a Winner Take All embodiment, the device 1 identifies which of the circuits SUMi generates the highest output voltage, and thus which group 2 of memory blocks SRAM/XNOR sinks the largest total current from the common output node that is connected to the input of the SUMi circuit. The group 2 that generates the highest current is the one that finds the most matches between the values stored in the memory blocks SRAM/XNOR and the corresponding components of the input digital vector SDi. For example, suppose there are ten blocks SRAM/XNOR in each group 2, and that each vector SDi includes ten corresponding components. Furthermore, assume that out of the ten possible matches between the ten values stored in the memory blocks SRAM/XNOR and the ten components of the vectors SDi, there are eight matches between the components of SD1 and the corresponding group 2, and four matches between the components of SD2 and its corresponding group 2. Therefore, the group 2 corresponding to SD1 would sink a greater current than the group 2 corresponding to SD2, and thus SUM1 would generate a greater output voltage than SUM2. The selector device 1 would then identify that SUM1 had the higher input voltage. One could then read this data and determine that there were more matches with SD1 than there were with SD2.

The CLASS system of FIG. 8 can be used in analog associative memories for pattern recognition as well as in associative memories in general. For example, the CLASS system can be used in an optical character recognition (OCR) system, or for simple motion control functions in robotics. The CLASS system can also be used in personal digital assistants (PDA). For example, where the CLASS system is part of an OCR system, the CLASS circuit receives at all of its inputs a vector SD that represents a character. The CLASS circuit also stores in the memory MA a database of characters. The vector SD is then compared with each of the characters that are stored in the groups 2 of memory blocks SRAM/XNOR. Each of the groups 2 generates at its common output node a current that is proportional to the number of matches between the stored values and the components of the vector SD. The WTA circuit 1 then determines which of the currents is the greatest, i.e., which of the stored characters has the most component matches with the vector SD, and thus which character the vector SD represents. The vector SD is then coded into the recognized character by circuitry that is not shown here for clarity.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A device for identifying the largest-magnitude signal of a plurality of signals, the device comprising:

a plurality of input terminals each coupled to receive one of said signals;

a plurality of comparison terminals coupled to receive a comparison signal;

a plurality of comparator circuits each including a comparator input terminal and a comparator output terminal;

a plurality of input switches each coupled between one of said input terminals and one of said comparator input terminals;

a plurality of comparison switches each coupled between one of said comparison terminals and said one of said comparator input terminals;

a logic circuit having a plurality of logic input terminals each coupled to one of said comparator output terminals, said logic circuit having a logic output terminal; and a plurality of latches each having an output terminal, an input terminal coupled to said one of said comparator output terminals, and an enable terminal coupled to said logic output terminal.

2. The device of claim 1 wherein each of said comparator circuits comprises:

a capacitor having a first terminal coupled to said comparator input terminal and having a second terminal;

an inverter having an input terminal coupled to said second terminal of said capacitor and having an output terminal coupled to said comparator output terminal; and a additional switch that is coupled between said input and output terminals of said first inverter.

3. The device of claim 1 wherein each of said comparator circuits comprises:

a supply terminal;

a capacitor having a first terminal coupled to said comparator input terminal and having a second terminal;

a first inverter having an input terminal coupled to said second terminal of said capacitor and having an output terminal;

a first switch that is coupled between said input and output terminals of said first inverter;

a second inverter having an input terminal coupled to said output terminal of said first inverter and having an output terminal coupled to said comparator output terminal; and a second switch that is coupled between said input terminal of said second inverter and said supply terminal, said second switch having a control terminal that is coupled to said output terminal of said second inverter.

4. The device of claim 1 wherein said logic circuit comprises a NOR gate having input terminals that are each coupled to one of said logic input terminals and having an output terminal that is coupled to said logic output terminal.

5. The device of claim 1 wherein said latches are active-low enable.

6. The device of claim 1 wherein said latches are active-high enable.

7. A device for determining which of a plurality of signals has the greatest magnitude, the device comprising:
a plurality of input terminals each coupled to receive one of said signals;
a plurality of comparison terminals coupled to receive a comparison signal;
a plurality of comparator circuits each including,
a comparator input terminal,
a comparator output terminal,
a supply terminal,
a capacitor having a first terminal coupled to said comparator input terminal and having a second terminal,
a first inverter having an input terminal coupled to said second terminal of said capacitor and having an output terminal,
a first switch that is coupled between said input and output terminals of said first inverter,
a second inverter having an input terminal coupled to said output terminal of said first inverter and having an output terminal,
a second switch that is coupled between said input terminal of said second inverter and said supply terminal, said second switch having a control terminal that is coupled to said output terminal of said second inverter, and
a third inverter having an input terminal coupled to said output terminal of said second inverter and having an output terminal coupled to said comparator output terminal;
a plurality of input switches each coupled between one of said input terminals and one of said comparator input terminals;
a plurality of comparison switches each coupled between one of said comparison terminals and one of said comparator input terminals;
a NOR gate having a plurality of input terminals each coupled to one of said comparator output terminals, said NOR gate having an output terminal; and
a plurality of latches each having an output terminal, an input terminal coupled to one of said comparator output terminals, and an enable terminal coupled to said output terminal of said NOR gate.

8. A method for identifying the largest magnitude signal of a plurality of signals each signal having a respective voltage magnitude, the method comprising:
storing for said each signal of said plurality of signals a respective stored voltage having a magnitude that is equal to a difference between the respective voltage magnitude of said each signal and a magnitude of a respective reference voltage;
generating a comparison signal that has a nonzero slope and that has an initial voltage magnitude that is greater than the magnitudes of said stored voltages,
comparing respective differences between said comparison signal and each of said stored voltages to said magnitudes of said respective reference voltages; and
detecting a first time that one of said respective differences becomes less than said magnitude of said respective reference voltage.

9. The method of claim 8 wherein said comparison signal comprises a voltage ramp having a negative slope.

10. The method of claim 8 wherein said magnitudes of said respective reference voltages are unequal to one another.

11. An analog voltage-signal selector device comprising:
a plurality of comparator circuits, each comparator circuit having a first and a second input terminal coupled to respectively receive an analog voltage-comparison signal and one of a plurality of analog voltage signals, each analog voltage signal having a predetermined values said each comparator circuit also having an output terminal for providing a respective digital voltage signal;
a logic circuit having a plurality of input terminals each coupled to a respective output terminal of the comparator circuits and having an output terminal; and
a plurality of latches each having an input terminal coupled to the output terminal of a respective one of the comparator circuits and having a drive terminal coupled to the output terminal of the logic circuit, each of said latches having an output terminal corresponding to a respective output of the selector device.

12. The device of claim 11 wherein each comparator circuit includes between its input terminals and said output terminal a first and a second inverter coupled together in cascade.

13. The device of claim 12 wherein the first inverter comprises an input terminal and an output terminal fedback to said input terminal through a first switch circuit element.

14. The device of claim 12 wherein the comparator circuit comprises at least one feedback network inserted between an input terminal of the second inverter and the output terminal of said comparator circuit.

15. The device of claim 12, wherein each comparator circuit of said plurality of comparator circuits further comprises:
a first switch element having a first terminal coupled to said first input terminal;
a capacitive element having a first terminal coupled to a second terminal of said first switch element and a second terminal coupled to an input of said first inverter;
a second switch element having a first terminal coupled to said second input terminal and a second terminal coupled to said first terminal of said capacitive element; and
wherein the first and second input terminals of each comparator circuit are alternately and respectively coupled to the first terminal of the capacitive element through said first and second switch elements.

16. The device of claim 15, further including a third switch element having a first terminal coupled to an input of the first inverter and a second terminal coupled to an output of the first inverter wherein the second and third switch circuit elements are driven respectively by first and second digital signals which are mutually complementary.

17. The device of claim 16 wherein the first switch circuit element is driven by a third digital signal that is synchronized with the first digital signal.

18. The device of claim 11 wherein the analog voltage-comparison signal comprises a ramp signal.

19. The device of claim 18 wherein an initial value of said analog voltage-comparison signal is higher than the predetermined value of each analog voltage signal.

20. The device of claim 11 wherein the device is part of a CMOS integrated circuit.

* * * * *